US011873375B2

(12) United States Patent
Schwartz et al.

(10) Patent No.: US 11,873,375 B2
(45) Date of Patent: Jan. 16, 2024

(54) REINFORCED POLYCARBONATE COMPOSITIONS WITH IMPROVED HEAT RESISTANCE

(71) Applicant: SHIPP GLOBAL TECHNOLOGIES B.V., Bergen op Zoom (NL)

(72) Inventors: Erik Schwartz, Bergen op Zoom (NL); Sascha Jan ter Horst, Bergen op Zoom (NL); Mark Adrianus Johannes van der Mee, Bergen op Zoom (NL); Johannes Martinus Dina Goossens, Bergen op Zoom (NL); Robert Dirk van de Grampel, Bergen op Zoom (NL); Tony Farrell, Bergen op Zoom (NL)

(73) Assignee: SHPP GLOBAL TECHNOLOGIES B.V., Bergen op Zoom (NL)

( * ) Notice: Subject to any disclaimer, the term of this patent is extended or adjusted under 35 U.S.C. 154(b) by 194 days.

(21) Appl. No.: 16/911,675

(22) Filed: Jun. 25, 2020

(65) Prior Publication Data

US 2020/0407517 A1   Dec. 31, 2020

(30) Foreign Application Priority Data

Jun. 28, 2019   (EP) .................................... 19183241

(51) Int. Cl.
| | | |
|---|---|---|
| C08L 69/00 | (2006.01) | |
| C08K 7/14 | (2006.01) | |
| C08K 5/5399 | (2006.01) | |
| C08J 5/04 | (2006.01) | |
| C08G 64/08 | (2006.01) | |
| C08J 9/00 | (2006.01) | |
| C08K 5/00 | (2006.01) | |
| C08K 5/521 | (2006.01) | |
| C08L 27/18 | (2006.01) | |
| C08L 83/04 | (2006.01) | |
| C08K 5/523 | (2006.01) | |

(52) U.S. Cl.
CPC ............ *C08J 5/043* (2013.01); *C08G 64/085* (2013.01); *C08J 9/009* (2013.01); *C08K 5/0066* (2013.01); *C08K 5/521* (2013.01); *C08K 5/5399* (2013.01); *C08K 7/14* (2013.01); *C08L 27/18* (2013.01); *C08L 69/00* (2013.01); *C08L 69/005* (2013.01); *C08L 83/04* (2013.01); *C08K 5/523* (2013.01); *C08L 2201/08* (2013.01); *C08L 2203/20* (2013.01); *C08L 2203/30* (2013.01); *C08L 2205/025* (2013.01); *C08L 2205/035* (2013.01)

(58) Field of Classification Search
None
See application file for complete search history.

(56) References Cited

U.S. PATENT DOCUMENTS

| | | |
|---|---|---|
| 8,779,040 B2 | 7/2014 | van de Weele et al. |
| 9,018,286 B2 | 4/2015 | Daga et al. |
| 9,732,217 B2 | 8/2017 | Wan et al. |
| 2007/0191518 A1 | 8/2007 | Chen et al. |
| 2013/0313493 A1 | 11/2013 | Wen et al. |
| 2013/0317141 A1* | 11/2013 | Cheng ..................... C08L 67/02 524/122 |
| 2013/0317142 A1 | 11/2013 | Chen et al. |
| 2014/0234629 A1 | 8/2014 | Sun et al. |
| 2014/0295363 A1 | 10/2014 | Sun et al. |
| 2017/0037245 A1 | 2/2017 | Van De Wetering |
| 2017/0044365 A1* | 2/2017 | van de Wetering ..... C08K 3/22 |
| 2017/0313876 A1 | 11/2017 | Atkinson et al. |
| 2021/0095118 A1* | 4/2021 | Farrell .................. C08L 69/005 |

FOREIGN PATENT DOCUMENTS

| | | |
|---|---|---|
| WO | 2013175448 A1 | 11/2013 |
| WO | 2014072923 A1 | 5/2014 |
| WO | 2015065611 A1 | 5/2015 |
| WO | 2017203480 A1 | 11/2017 |

* cited by examiner

*Primary Examiner* — David J Buttner
(74) *Attorney, Agent, or Firm* — CANTOR COLBURN LLP

(57) ABSTRACT

A reinforced polycarbonate composition includes 30-60 wt % of a homopolycarbonate; 5-30 wt % of a poly(carbonate-siloxane); 10-40 wt % of a high heat polycarbonate having a glass transition temperature of 170° C. or higher determined per ASTM D3418 with a 20° C./min heating rate; 1-10 wt % of a phosphorous-containing flame retardant present in amount effective to provide 0.1-1.5 wt % phosphorous; 0.01-0.5 wt % of an anti-drip agent; 5-30 wt % of a reinforcing fiber; and optionally, up to 10 wt % of an additive composition, wherein each amount is based on the total weight of the reinforced polycarbonate composition, which sums to 100 wt %. A molded sample of the polycarbonate composition has a heat deflection temperature greater than 115° C., preferably greater than 125° C., more preferably greater than 130° C., or a flame test rating of V1, preferably V0 as measured according to UL-94 at a thickness of 0.8 millimeter, or at a thickness of 0.6 mm, or at a thickness of 0.4 mm.

16 Claims, No Drawings

REINFORCED POLYCARBONATE COMPOSITIONS WITH IMPROVED HEAT RESISTANCE

CROSS-REFERENCE TO RELATED APPLICATION

This application claims priority to EP Application No. 19183241.9, filed Jun. 28, 2019, and all the benefits accruing under 35 U.S.C. § 119, the content of which is incorporated by reference in its entirety.

BACKGROUND

This disclosure relates to polycarbonate compositions, and in particular to reinforced polycarbonate compositions, methods of manufacture, and uses thereof.

Polycarbonates are useful in the manufacture of articles and components for a wide range of applications, from automotive parts to electronic appliances. Reinforced polycarbonate compositions, i.e., polycarbonate compositions comprising fibrous fillers, can provide additional strength and other advantageous properties. Because of their broad use, particularly in electronics, it is desirable to provide reinforced polycarbonate compositions with improved heat resistance.

There accordingly remains a need in the art for reinforced polycarbonate compositions having high heat resistance. It would be a further advantage if the compositions had improved flammability ratings at very low thicknesses.

BRIEF DESCRIPTION

A reinforced polycarbonate composition comprises 30-60 wt % of a homopolycarbonate; 5-30 wt % of a poly(carbonate-siloxane), preferably present in an amount effective to provide 2-6 wt % of siloxane; 10-40 wt % of a high heat polycarbonate having a glass transition temperature of 170° C. or higher determined per ASTM D3418 with a 20° C./min heating rate; 1-10 wt % of a phosphorous-containing flame retardant present in amount effective to provide 0.1-1.5 wt % phosphorous; 0.01-0.5 weight percent of an anti-drip agent; 5-30 wt % of a reinforcing fiber; and optionally, up to 10 wt % of an additive composition, wherein each amount is based on the total weight of the reinforced polycarbonate composition, which sums to 100 wt %; and wherein a molded sample of the polycarbonate composition has a heat deflection temperature of greater than 115° C., preferably greater than 125° C., more preferably greater than 130° C., each as measured according to ISO 75 at 0.45 megapascal, or a flame test rating of V1, preferably V0 as measured according to UL-94 at a thickness of 0.8 millimeter, or at a thickness of 0.6 mm, or at a thickness of 0.4 mm, or a combination thereof.

In another aspect, a method of manufacture comprises combining the above-described components to form a reinforced polycarbonate composition.

In yet another aspect, an article comprises the above-described reinforced polycarbonate composition.

In still another aspect, a method of manufacture of an article comprises molding, extruding, or shaping the above-described reinforced polycarbonate composition into an article.

The above described and other features are exemplified by the following drawings, detailed description, examples, and claims.

DETAILED DESCRIPTION

There is a need for thin-walled articles made from reinforced, flame retardant polycarbonate compositions having high heat resistance, while maintaining other properties such as impact and relative temperature index (RTI). In particular, compositions for thin-walled compositions are needed having a heat deformation temperature (HDT) of greater than 115° C. and a UL-94 flammability rating of V1, preferably V0, at 0.8 millimeter (mm). In addition, there is an increasing demand for more environmentally friendly polycarbonate compositions without bromine and chlorine. Some commercially available chlorine-free and bromine-free polycarbonate compositions that include flame retardants such as RIMAR salt or poly(tetrafluoroethylene) have good heat resistance and impact properties; but do not possess adequate flammability ratings at low thicknesses, less than 1 millimeter (mm), for example. Other commercially available polycarbonate compositions that include chlorine-free and bromine-free flame retardants possess good flammability ratings at low thicknesses, but these materials have insufficient heat resistance for some high heat applications. For example, it is known that phosphonate or phosphazene flame retardants can decrease the heat resistance of polycarbonate compositions.

Surprisingly and unexpectedly, the inventors hereof have discovered reinforced polycarbonate compositions having high heat resistance, flammability ratings of V1, preferably V0, at a thickness of 0.8 mm, 0.6 mm, or even 0.4 mm, and good impact properties. These compositions comprise a homopolycarbonate, a poly(carbonate-siloxane), a high-heat polycarbonate having a glass transition temperature of 170° C. or higher determined per ASTM D3418 with a 20° C./min heating rate, a phosphorous-containing flame retardant, and a reinforcing filler.

In an aspect, the reinforced polycarbonate composition comprises 30-60 weight percent (wt %) of the homopolycarbonate, preferably a bisphenol A homopolycarbonate; 5-25 wt % of the poly(carbonate-siloxane), preferably in an amount effective to provide 2-6 wt % of dimethyl siloxane; 10-40 wt % of the high heat polycarbonate; 1-10 wt % of the flame retardant, preferably wherein the flame retardant is an oligomeric phosphate, a phosphazene, or a combination thereof; 0.01-0.5 weight percent of polytetrafluoroethylene or an encapsulated polytetrafluoroethylene as an anti-drip agent; and 5-30 wt % of reinforcing fibers, preferably glass fibers; wherein each amount is based on the total weight of the reinforced polycarbonate composition, which sums to 100 wt %. A molded sample of the polycarbonate composition has an HDT of a heat deflection temperature of greater than 115° C., preferably greater than 125° C., more preferably greater than 130° C., each as measured according to ISO 75 at 0.45 megapascal, or a flame test rating of V1, preferably V0, as measured according to UL-94 at a thickness of 0.8 millimeter, or at a thickness of 0.6 mm, or at a thickness of 0.4 mm.

In another aspect, the reinforced polycarbonate composition comprises 30-60 wt % of the homopolycarbonate; 5-20 wt %, or 8-16 wt % of the poly(carbonate-siloxane), preferably in an amount effective to provide 2-4 wt % of dimethyl siloxane; 15-35 wt %, or 20-30 wt % of the high heat polycarbonate; 2-8 wt %, or 3-7 wt % of the flame retardant in amount effective to provide 0.4-1.0 wt % phosphorous; 0.01-0.5 weight percent of an encapsulated polytetrafluoroethylene as an anti-drip agent; and 5-30 wt %, or 5-15 wt %, of the reinforcing fibers, preferably glass fibers; wherein each amount is based on the total weight of the reinforced polycarbonate composition, which sums to 100 wt %. A molded sample of the reinforced polycarbonate composition has an HDT of a heat deflection temperature of greater than 115° C., preferably greater than 125° C., more preferably greater than 130° C., each as measured according to ISO 75 at 0.45 megapascal, or a flame test rating of V1, preferably V0, as measured according to UL-94 at a thickness of 0.8 millimeter, or at a thickness of 0.6 mm, or at a thickness of 0.4 mm, or a combination thereof.

The individual components of the reinforced polycarbonate compositions are described in further detail below.

"Polycarbonate" as used herein means a polymer having repeating structural carbonate units of formula (1)

(1)

in which at least 60 percent of the total number of $R^1$ groups contain aromatic moieties and the balance thereof are aliphatic, alicyclic, or aromatic. In an aspect, each $R^1$ is a $C_{6-30}$ aromatic group, that is, contains at least one aromatic moiety. $R^1$ can be derived from an aromatic dihydroxy compound of the formula HO—$R^1$—OH, in particular of the formula

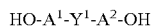

wherein each of $A^1$ and $A^2$ is a monocyclic divalent aromatic group and $Y^1$ is a single bond or a bridging group having one or more atoms that separate $A^1$ from $A^2$. In an aspect, one atom separates $A^1$ from $A^2$. Specifically, each $R^1$ can be derived from a bisphenol of formula (2)

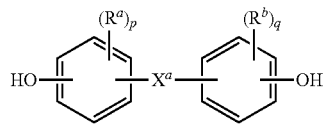

(2)

wherein $R^a$ and $R^b$ are each independently a halogen, $C_{1-12}$ alkoxy, or $C_{1-12}$ alkyl, and p and q are each independently integers of 0-4. It will be understood that when p or q is less than 4, the valence of each carbon of the ring is filled by hydrogen. Also in formula (2), $X^a$ is a $C_{1-60}$ bridging group connecting the two hydroxy-substituted aromatic groups, where the bridging group and the hydroxy substituent of each $C_6$ arylene group are disposed ortho, meta, or para (specifically para) to each other on the $C_6$ arylene group. In an aspect, the bridging group $X^a$ is single bond, —O—, —S—, —S(O)—, —S(O)$_2$—, —C(O)—, or a $C_{1-60}$ organic group. The $C_{1-60}$ organic bridging group can be cyclic or acyclic, aromatic or non-aromatic, and can further comprise heteroatoms such as halogens, oxygen, nitrogen, sulfur, silicon, or phosphorous. The $C_{1-60}$ organic group can be disposed such that the $C_6$ arylene groups connected thereto are each connected to a common alkylidene carbon or to different carbons of the $C_{1-60}$ organic bridging group. In an aspect, p and q is each 1, and $R^a$ and $R^b$ are each a $C_{1-3}$ alkyl group, specifically methyl, disposed meta to the hydroxy group on each arylene group.

The polycarbonates in the reinforced polycarbonate compositions include a homopolycarbonate (wherein each $R^1$ in the polymer is the same), a high heat polycarbonate, and a poly(carbonate-siloxane). In an aspect, the homopolycarbonate in the reinforced composition is derived from a bisphenol of formula (2), preferably bisphenol A, in which each of $A^1$ and $A^2$ is p-phenylene and $Y^1$ is isopropylidene in formula (2). The homopolycarbonate can have an intrinsic viscosity, as determined in chloroform at 25° C., of 0.3-1.5 deciliters per gram (dl/gm), preferably 0.45-1.0 dl/gm. The homopolycarbonate can have a weight average molecular weight (Mw) of 10,000-200,000 grams per mol (g/mol), preferably 20,000-100,000 g/mol, as measured by gel permeation chromatography (GPC), using a crosslinked styrene-divinylbenzene column and calibrated to bisphenol A homopolycarbonate references. GPC samples are prepared at a concentration of 1 mg per ml and are eluted at a flow rate of 1.5 ml per minute. In some aspects, the homopolycarbonate is a bisphenol A homopolycarbonate having an Mw of 18,000-35,000 grams/mole, preferably 20,000-25,000 g/mol; or a bisphenol A homopolycarbonate having a weight average molecular weight of 25,000-35,000 g/mol, preferably 27,000-32,000 g/mol; or a combination thereof, each as measured as described above.

The reinforced polycarbonate compositions further include a high heat polycarbonate, which as used herein means a polycarbonate having a glass transition temperature (Tg) of 170° C. or higher, determined per ASTM D3418 with a 20° C./min heating rate. The high heat polycarbonate can be an aromatic poly(ester-carbonate). Such polycarbonates further contain, in addition to recurring carbonate units of formula (1), repeating ester units of formula (3)

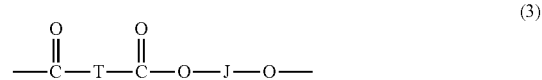

(3)

wherein J is a divalent group derived from an aromatic dihydroxy compound (including a reactive derivative thereof), such as a bisphenol of formula (2), e.g., bisphenol A; and T is a divalent group derived from an aromatic dicarboxylic acid (including a reactive derivative thereof), preferably isophthalic or terephthalic acid wherein the weight ratio of isophthalic acid to terephthalic acid is 91:9 to 2:98. Copolyesters containing a combination of different T or J groups can be used. The polyester units can be branched or linear.

In an aspect, J is derived from a bisphenol of formula (2), e.g., bisphenol A. In an aspect, a portion of the groups J, for example up to 20 mole percent (mol %) can be an aromatic dihydroxy compound, e.g., resorcinol, or $C_{2-30}$ alkylene group having a straight chain, branched chain, or cyclic (including polycyclic) structure, for example ethylene, n-propylene, i-proplyene, 1,4-butylene, 1,4-cyclohexylene, or 1,4-methylenecyclohexane. Preferably, all J groups are bisphenol groups of formula (2).

Aromatic dicarboxylic acids that can be used to prepare the polyester units include isophthalic or terephthalic acid, 1,2-di(p-carboxyphenyl)ethane, 4,4'-dicarboxydiphenyl ether, 4,4'-bisbenzoic acid, or a combination thereof. Acids containing fused rings can also be present, such as in 1,4-, 1,5-, or 2,6-naphthalenedicarboxylic acids. Specific dicarboxylic acids include terephthalic acid, isophthalic acid, naphthalene dicarboxylic acid, or a combination thereof. A specific dicarboxylic acid comprises a combination of isophthalic acid and terephthalic acid wherein the weight ratio of isophthalic acid to terephthalic acid is 91:9 to 2:98. A portion of the groups T, for example up to 20 mol %, can be aliphatic, for example derived from 1,4-cyclohexane dicarboxylic acid. Preferably all T groups are aromatic.

The molar ratio of ester units to carbonate units in the polycarbonates can vary broadly, for example 1:99 to 99:1, preferably 10:90 to 90:10, more preferably 25:75 to 75:25, or 2:98 to 15:85, depending on the desired properties of the final composition.

Specific poly(ester-carbonate)s are those including bisphenol A carbonate units and isophthalate/terephthalate-bisphenol A ester units, i.e., a poly(bisphenol A carbonate)-co-(bisphenol A-phthalate-ester) of formula (4a)

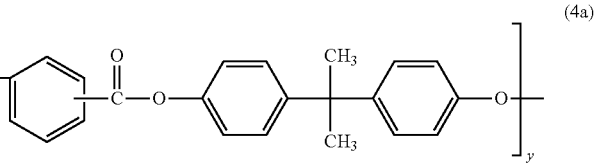

(4a)

wherein x and y represent the weight percent of bisphenol A carbonate units and isophthalate/terephthalate-bisphenol A ester units, respectively. Generally, the units are present as blocks. In an aspect, the weight ratio of carbonate units x to ester units y in the polycarbonates is 1:99 to 50:50, or 5:95 to 25:75, or 10:90 to 45:55. Copolymers of formula (5) comprising 35-45 wt % of carbonate units and 55-65 wt % of ester units, wherein the ester units have a molar ratio of isophthalate to terephthalate of 45:55 to 55:45 are often referred to as poly(carbonate-ester)s (PCE). Copolymers comprising 15-25 wt % of carbonate units and 75-85 wt % of ester units. wherein the ester units have a molar ratio of isophthalate to terephthalate from 98:2 to 88:12 are often referred to as poly(phthalate-carbonate)s (PPC).

The high heat poly(ester-carbonate)s can have an Mw of 2,000-100,000 g/mol, preferably 3,000-75,000 g/mol, more preferably 4,000-50,000 g/mol, more preferably 5,000-35,000 g/mol, and still more preferably 17,000-30,000 g/mol. Molecular weight determinations are performed using GPC using a cross linked styrene-divinyl benzene column, at a sample concentration of 1 milligram per milliliter, and as calibrated with bisphenol A homopolycarbonate standards. Samples are eluted at a flow rate of 1.0 ml/min with methylene chloride as the eluent.

Another type of high heat polycarbonate that can be used includes a high heat carbonate group, optionally together with a low heat carbonate group. A combination of different high heat groups or low heat groups can be used.

The low heat carbonate group can be derived from bisphenols of formula (2) as described above wherein $X^a$ is a $C_{1-18}$ bridging group. For example, $X^a$ can be a $C_{3-6}$ cycloalkylidene, a $C_{1-6}$ alkylidene of the formula —C($R^c$)($R^d$)— wherein $R^c$ and $R^d$ are each independently hydrogen, $C_{1-5}$ alkyl, or a group of the formula —C(=$R^e$)— wherein W is a divalent $C_{1-5}$ hydrocarbon group. Some illustrative examples of dihydroxy compounds that can be used in the manufacture of the low heat monomer units are described, for example, in WO 2013/175448 A1, US 2014/0295363, and WO 2014/072923. In an aspect, the low heat carbonate group is derived from bisphenol A, which provides the low heat group of the following formula.

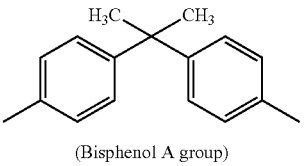

(Bisphenol A group)

The high heat carbonate group is derived from a high heat bisphenol monomer. As used herein, a high heat bisphenol monomer is a monomer where the corresponding homopolycarbonate of the monomer has a glass transition temperature (Tg) of 170° C. or higher, determined per ASTM D3418 with a 20° C./min heating rate. Examples of such high heat bisphenol groups include groups of formulas (6) to (12)

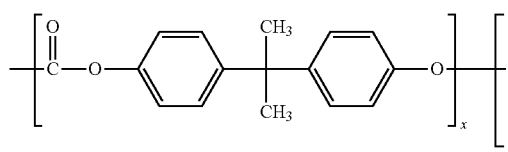

(6)

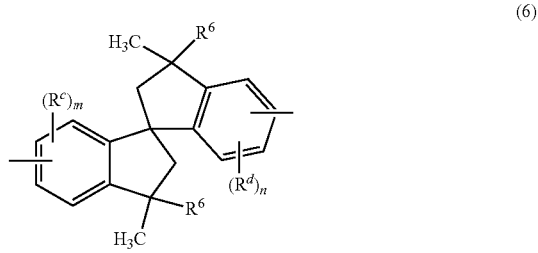

(7)

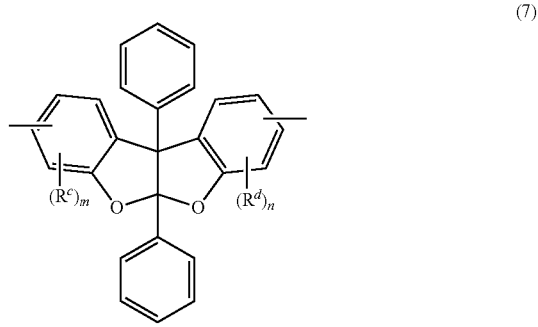

(8)

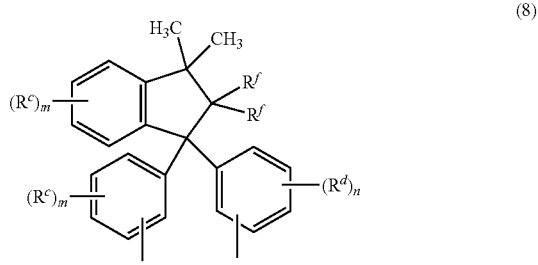

Exemplary high heat bisphenol groups are shown below (9)
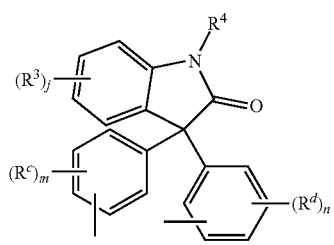

(10)
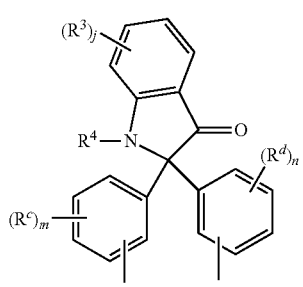

(11)
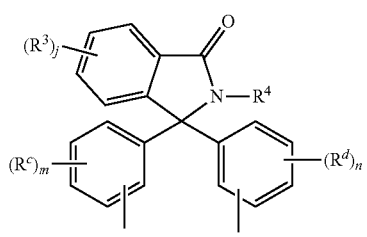

(12)
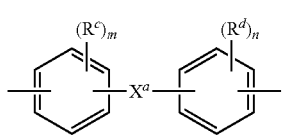

(11a)
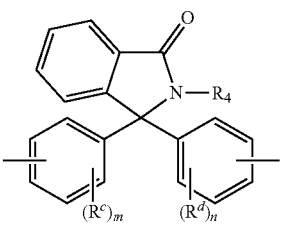

(12a)
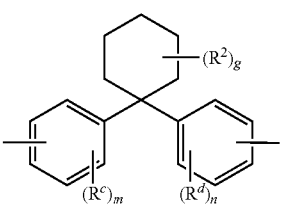

(12b)
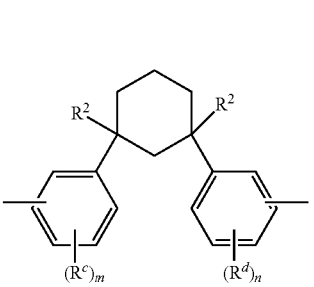

(12c)
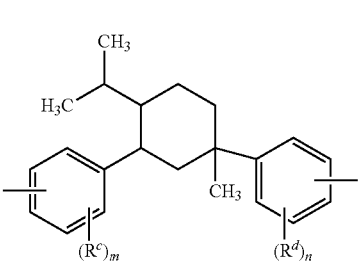

(12d)
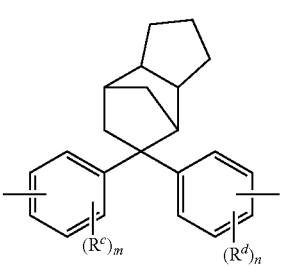

(12e)
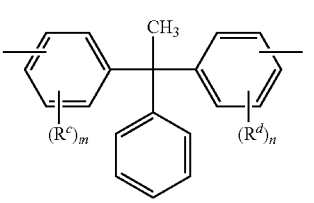

wherein $R^c$ and $R^d$ are each independently a $C_{1-12}$ alkyl, $C_{2-12}$ alkenyl, $C_{3-8}$ cycloalkyl, or $C_{1-12}$ alkoxy, each $R^f$ is hydrogen or both $R^f$ together are a carbonyl group, each $R^3$ is independently $C_{1-6}$ alkyl, $R^4$ is hydrogen, $C_{1-6}$ alkyl, or phenyl optionally substituted with 1-5 $C_{1-6}$ alkyl groups, each $R^6$ is independently $C_{1-3}$ alkyl, or phenyl, preferably methyl, $X^a$ is a $C_{6-12}$ polycyclic aryl, $C_{3-18}$ mono- or polycycloalkylene, $C_{3-18}$ mono- or polycycloalkylidene, —C($R^h$)($R^g$)— wherein $R^h$ is hydrogen, $C_{1-12}$ alkyl, or $C_{6-12}$ aryl and $R^g$ is $C_{6-10}$ alkyl, $C_{6-8}$ cycloalkyl, or $C_{6-12}$ aryl, or -($Q^1$)$_x$-G-($Q^2$)$_y$- wherein $Q^1$ and $Q^2$ are each independently a $C_{1-3}$ alkylene, G is a $C_{3-10}$ cycloalkylene, x is 0 or 1, and y is 1, and j, m and n are each independently 0-4, or 0 or 1. A combination of high heat bisphenol groups can be used.

In an aspect in formulas (6)-(12), $R^c$ and $R^d$ are each independently a $C_{1-3}$ alkyl, or $C_{1-3}$ alkoxy, each $R^6$ is methyl, each $R^3$ is independently $C_{1-3}$ alkyl, $R^4$ is methyl, or phenyl, each $R^6$ is independently $C_{1-3}$ alkyl or phenyl, preferably methyl, $X^a$ is a $C_{6-12}$ polycyclic aryl, $C_{3-18}$ mono- or polycycloalkylene, $C_{3-18}$ mono- or polycycloalkylidene, —C($R^f$)($R^g$)— wherein $R^f$ is hydrogen, $C_{1-12}$ alkyl, or $C_{6-12}$ aryl and $R^g$ is $C_{6-10}$ alkyl, $C_{6-8}$ cycloalkyl, or $C_{6-12}$ aryl, or -($Q^1$)$_x$-G-($Q^2$)$_y$- group, wherein $Q^1$ and $Q^2$ are each independently a $C_{1-3}$ alkylene and G is a $C_{3-10}$ cycloalkylene, x is 0 or 1, and y is 0 or 1, and j, m, and n are each independently 0 or 1.

-continued (12f)
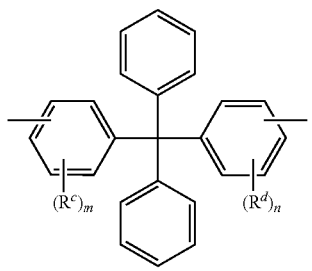

(12g)
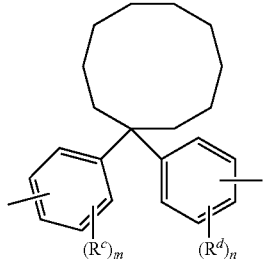

(12i)
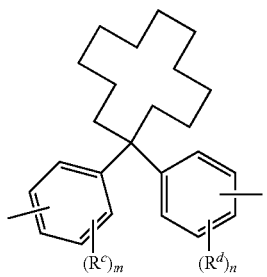

(12k)
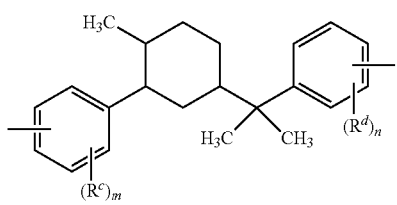

(12j)
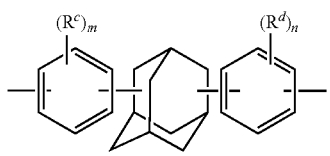

(12k)
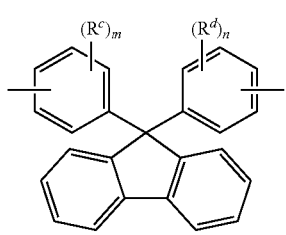

wherein $R^c$ and $R^d$ are the same as defined for formulas (6) to (12), each $R^2$ is independently $C_{1-4}$ alkyl, m and n are each independently 0-4, each $R^3$ is independently $C_{1-4}$ alkyl or hydrogen, $R^4$ is $C_{1-6}$ alkyl or phenyl optionally substituted with 1-5 $C_{1-6}$ alkyl groups, and g is 0-10. In a specific aspect each bond of the bisphenol group is located para to the linking group that is $X^a$. In an aspect, $R^c$ and $R^d$ are each independently a $C_{1-3}$ alkyl, or $C_{1-3}$ alkoxy, each $R^2$ is methyl, x is 0 or 1, y is 1, and m and n are each independently 0 or 1.

The high heat bisphenol group is preferably of formula (11a-2) or (12a-2)

(11a-2)
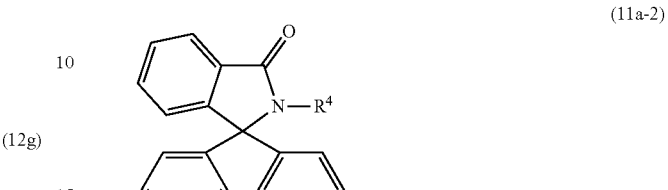

(12a-2)
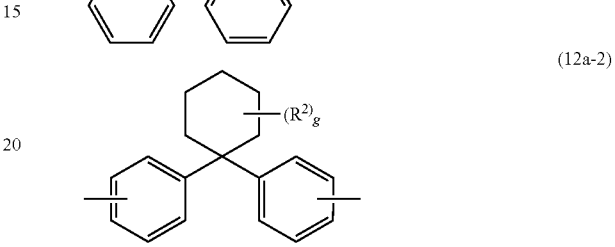

wherein $R^4$ is methyl or phenyl, each $R^2$ is methyl, and g is 1-4. Preferably, the high heat bisphenol group is derived from N-phenyl phenolphthalein bisphenol (PPPBP, also known as 2-phenyl-3,3'-bis(4-hydroxyphenyl)) or from 1,1-bis(4-hydroxyphenyl)-3,3,5-trimethyl-cyclohexane (BP-TMC).

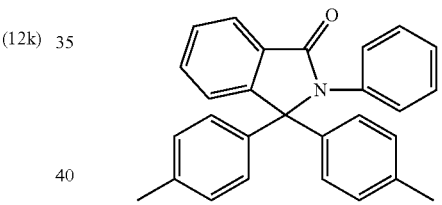
(PPPBP group)

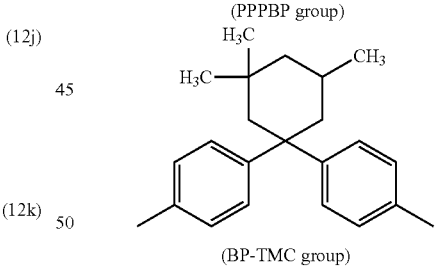
(BP-TMC group)

This high heat polycarbonate can include 0-90 mol %, or 10-80 mol % of low heat aromatic carbonate units, preferably bisphenol A carbonate units; and 10-100 mol %, preferably 20-90 mol % of high heat aromatic carbonate units, even more preferably wherein the high heat carbonate units are derived from 1,1-bis(4-hydroxyphenyl)-3,3,5-trimethyl-cyclohexane, 4,4'-(1-phenylethylidene)bisphenol, 4,4'-(3,3-dimethyl-2,2-dihydro-1H-indene-1,1-diyl)diphenol, 1,1-bis(4-hydroxyphenyl)cyclododecane, 3,8-dihydroxy-5a,10b-diphenyl-coumarano-2',3',2,3-coumarane, or a combination thereof, wherein each amount is based on the total moles of the carbonate units, which sums to 100 mol %.

In certain aspects, the high heat polycarbonate includes 60-80 mol % of bisphenol A carbonate units and 20-40 mol % of high heat aromatic carbonate units derived from 1,1-bis(4-hydroxyphenyl)-3,3,5-trimethyl-cyclohexane, N-phenyl phenolphthalein bisphenol, or a combination thereof, wherein each amount is based on the total moles of the carbonate units, which sums to 100 mol %.

The high heat polycarbonates comprising high heat carbonate units can have an Mw of 10,000-50,000 g/mol, or 16,000-300,000 g/mol, as measured by gel permeation chromatography (GPC), using a crosslinked styrene-divinylbenzene column and calibrated to bisphenol A homopolycarbonate references. GPC samples are prepared at a concentration of 1 mg per ml and are eluted at a flow rate of 1.5 ml per minute.

The reinforced polycarbonate composition further comprises a poly(carbonate-siloxane) copolymer. The polysiloxane blocks comprise repeating diorganosiloxane units as in formula (13)

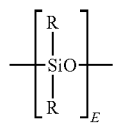
(13)

wherein each R is independently a $C_{1-13}$ monovalent organic group. For example, R can be a $C_{1-13}$ alkyl, $C_{1-13}$ alkoxy, $C_{2-13}$ alkenyl, $C_{2-13}$ alkenyloxy, $C_{3-6}$ cycloalkyl, $C_{3-6}$ cycloalkoxy, $C_{6-14}$ aryl, $C_{6-10}$ aryloxy, $C_{7-13}$ arylalkylene, $C_{7-13}$ arylalkylenoxy, $C_{7-13}$ alkylarylene, or $C_{7-13}$ alkylaryleneoxy. The foregoing groups can be fully or partially halogenated with fluorine, chlorine, bromine, or iodine, or a combination thereof. In an aspect, where a transparent poly(carbonate-siloxane) is desired, R is unsubstituted by halogen. Combinations of the foregoing R groups can be used in the same copolymer.

The value of E in formula (13) can vary widely depending on the type and relative amount of each component in the reinforced polycarbonate composition, the desired properties of the composition, and like considerations. Generally, E has an average value of 2-1,000, specifically 2-500, 2-200, or 2-125, 5-80, or 10-70. In an aspect, E has an average value of 10-80 or 10-40, and in still another aspect, E has an average value of 40-80, or 40-70. Where E is of a lower value, e.g., less than 40, it can be desirable to use a relatively larger amount of the poly(carbonate-siloxane) copolymer. Conversely, where E is of a higher value, e.g., greater than 40, a relatively lower amount of the poly(carbonate-siloxane) copolymer can be used.

In an aspect, the polysiloxane blocks are of formula (14)

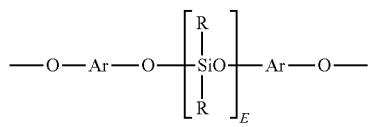
(14)

wherein E and R are as defined in formula (13); and Ar can be the same or different, and is a substituted or unsubstituted $C_{6-30}$ arylene, wherein the bonds are directly connected to an aromatic moiety. Ar groups in formula (14) can be the same or different, and can be derived from a $C_{6-30}$ dihydroxyarylene compound, for example a bisphenol compound of formula (2). Exemplary dihydroxyarylene compounds are 1,1-bis(4-hydroxyphenyl) methane, 1,1-bis(4-hydroxyphenyl) ethane, 2,2-bis(4-hydroxyphenyl) propane, 2,2-bis(4-hydroxyphenyl) butane, 2,2-bis(4-hydroxyphenyl) octane, 1,1-bis(4-hydroxyphenyl) propane, 1,1-bis(4-hydroxyphenyl) n-butane, 2,2-bis(4-hydroxy-1-methylphenyl) propane, 1,1-bis(4-hydroxyphenyl) cyclohexane, bis(4-hydroxyphenyl sulfide), and 1,1-bis(4-hydroxy-t-butylphenyl) propane.

In another aspect, the polysiloxane blocks are of formula (15)

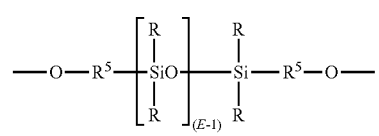
(15)

wherein E and R are as defined in formula (13), and each $R^5$ is independently a divalent $C_{1-30}$ organic group, and wherein the polymerized polysiloxane unit is the reaction residue of its corresponding dihydroxy compound. In a specific aspect, the polysiloxane blocks are of formula (16):

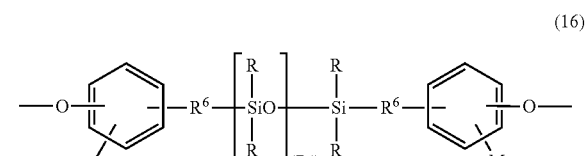
(16)

wherein R and E are as defined above. $R^6$ in formula (16) is a divalent $C_{2-8}$ aliphatic group. Each M in formula (14) can be the same or different, and can be a halogen, cyano, nitro, $C_{1-8}$ alkylthio, $C_{1-8}$ alkyl, $C_{1-8}$ alkoxy, $C_{2-8}$ alkenyl, $C_{2-8}$ alkenyloxy, $C_{3-8}$ cycloalkyl, $C_{3-8}$ cycloalkoxy, $C_{6-10}$ aryl, $C_{6-10}$ aryloxy, $C_{7-12}$ aralkyl, $C_{7-12}$ aralkoxy, $C_{7-12}$ alkylaryl, or $C_{7-12}$ alkylaryloxy, wherein each n is independently 0, 1, 2, 3, or 4.

In an aspect, M is bromo or chloro, an alkyl such as methyl, ethyl, or propyl, an alkoxy such as methoxy, ethoxy, or propoxy, or an aryl such as phenyl, chlorophenyl, or tolyl; $R^6$ is a dimethylene, trimethylene or tetramethylene; and R is a $C_{1-8}$ alkyl, haloalkyl such as trifluoropropyl, cyanoalkyl, or aryl such as phenyl, chlorophenyl or tolyl. In another aspect, R is methyl, or a combination of methyl and trifluoropropyl, or a combination of methyl and phenyl. In still another aspect, R is methyl, M is methoxy, n is one, and $R^6$ is a divalent $C_{1-3}$ aliphatic group. Specific polysiloxane blocks are of the formulas

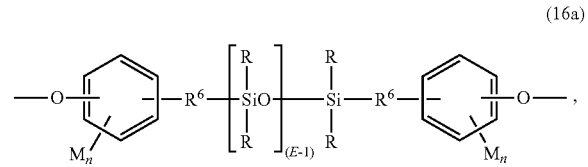
(16a)

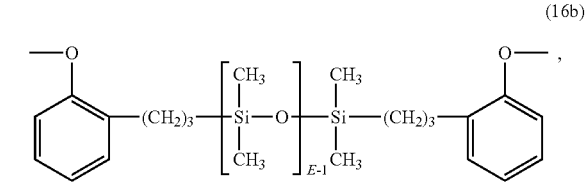
(16b)

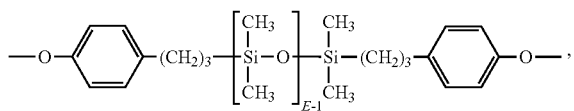

or a combination thereof, wherein E has an average value of 2-200, 2-125, 5-125, 5-100, 5-50, 20-80, or 5-20.

The poly(carbonate-siloxane) can comprise 50-99 wt % of carbonate units and 1-50 wt % siloxane units. Within this range, the poly(carbonate-siloxane) can comprise 70-98 wt %, more specifically 75-97 wt % of carbonate units and 2-30 wt %, more specifically 3-25 wt % siloxane units.

The poly(carbonate-siloxane) can have an Mw of 2,000-100,000 g/mol, specifically 5,000-50,000 g/mol as measured by gel permeation chromatography using a crosslinked styrene-divinyl benzene column, at a sample concentration of 1 milligram per milliliter, and as calibrated with bisphenol A homopolycarbonate standards. The poly(carbonate-siloxane)s can have a melt volume flow rate, measured at 300° C./1.2 kg, of 1-50 cubic centimeters per 10 minutes (cc/10 min), specifically 2-30 cc/10 min. Combinations of poly(carbonate-siloxane)s of different flow properties can be used to achieve the overall desired flow property.

The polycarbonates can be manufactured by processes such as interfacial polymerization and melt polymerization, which are known, and are described, for example, in WO 2013/175448 A1 and WO 2014/072923 A1. An end-capping agent (also referred to as a chain stopper agent or chain terminating agent) can be included during polymerization to provide end groups, for example monocyclic phenols such as phenol, p-cyanophenol, and $C_{1-22}$ alkyl-substituted phenols such as p-cumyl-phenol, resorcinol monobenzoate, and p- and tertiary-butyl phenol, monoethers of diphenols, such as p-methoxyphenol, monoesters of diphenols such as resorcinol monobenzoate, functionalized chlorides of aliphatic monocarboxylic acids such as acryloyl chloride and methacryloyl chloride, and mono-chloroformates such as phenyl chloroformate, alkyl-substituted phenyl chloroformates, p-cumyl phenyl chloroformate, and toluene chloroformate. Combinations of different end groups can be used. Branched polycarbonate blocks can be prepared by adding a branching agent during polymerization, for example trimellitic acid, trimellitic anhydride, trimellitic trichloride, tris-p-hydroxyphenylethane, isatin-bis-phenol, tris-phenol TC (1,3,5-tris((p-hydroxyphenypisopropyl)benzene), tris-phenol PA (4(4(1,1-bis(p-hydroxyphenyl)-ethyl) alpha, alpha-dimethyl benzyl)phenol), 4-chloroformyl phthalic anhydride, trimesic acid, and benzophenone tetracarboxylic acid. The branching agents can be added at a level of 0.05-2.0 wt %. Combinations comprising linear polycarbonates and branched polycarbonates can be used.

The flame retardant in the reinforced polycarbonate compositions are organophosphorous compounds, in particular organophosphates and phosphazenes. The organophosphates can be monomeric or oligomeric, and can have the structure of formula (17)

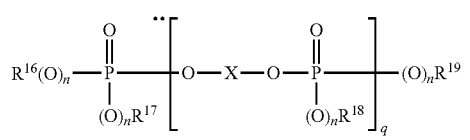

wherein $R^{16}$, $R^{17}$, $R^{18}$, and $R^{19}$ are each independently $C_{1-8}$ alkyl, $C_{5-6}$ cycloalkyl, $C_{6-20}$ aryl, or $C_{7-12}$ arylalkylene, each optionally substituted by $C_{1-12}$ alkyl, specifically by $C_{1-4}$ alkyl, and X is a mono- or poly-nuclear aromatic $C_{6-30}$ moiety or a linear or branched $C_{2-30}$ aliphatic radical, which can be OH-substituted and can contain up to 8 ether bonds, provided that at least one of $R^{16}$, $R^{17}$, $R^{18}$, $R^{19}$, and X is an aromatic group. In some aspects $R^{16}$, $R^{17}$, $R^{18}$, and $R^{19}$ are each independently $C_{1-4}$ alkyl, naphthyl, phenyl($C_{1-4}$ alkylene), or aryl groups optionally substituted by $C_{1-4}$ alkyl. Specific aryl moieties are cresyl, phenyl, xylenyl, propylphenyl, or butylphenyl. In some aspects X in formula (17) is a mono- or poly-nuclear aromatic $C_{6-30}$ moiety derived from a diphenol. Further in formula (17), n is each independently 0 or 1; in some aspects n is equal to 1. Also in formula (17), q is from 0.5-30, from 0.8-15, from 1-5, or from 1-2. Specifically, X can be represented by the following divalent groups (18) or a combination thereof.

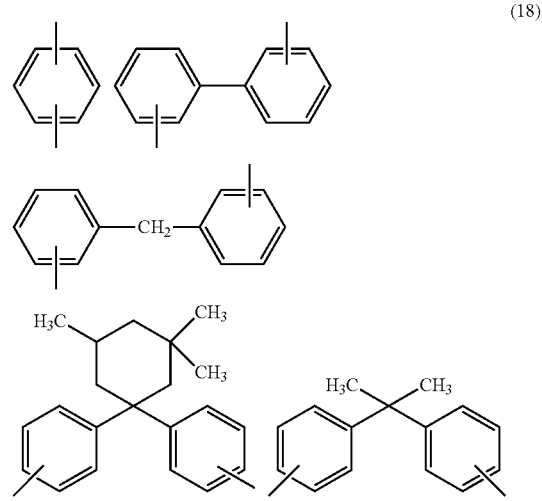

Preferably in formula (17), each of $R^{16}$, $R^{17}$, $R^{18}$, and $R^{19}$ can be aromatic, i.e., phenyl, n is 1, and q is 1-5, specifically 1-2, and X is of formula (18).

Specific flame retardants are represented by formula (17a):

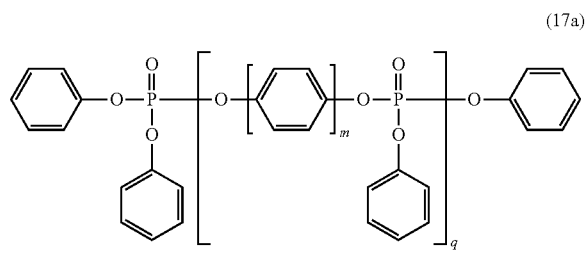

wherein m is 1 or 2, and q is as described in formula (17).

Commercially available flame retardants include an oligomeric phosphate ester having a phosphorous content of 10.7 wt %, a specific gravity of 1.3, and a melting point of 101-108° C., available as Sol-DP from FYROLFLEX and a phosphate ester of formula (17b)

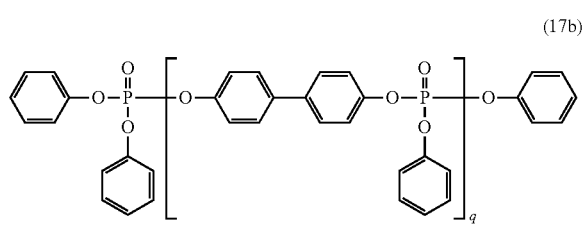

(17b)

having a phosphorous content 9.5 wt %, available as FP 800 from CEL-SPAN.

Phosphazenes (19) and cyclic phosphazenes (21)

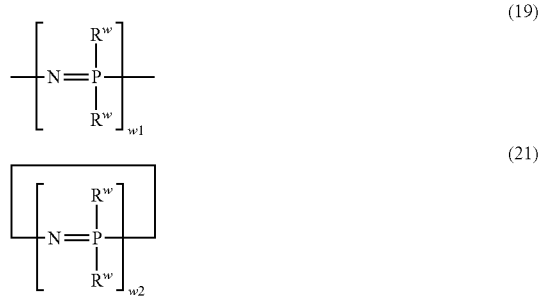

in particular can be used, wherein w1 is 3-10,000 and w2 is 3-25, specifically 3-7, and each $R^w$ is independently a $C_{1-12}$ alkyl, alkenyl, alkoxy, aryl, aryloxy, or polyoxyalkylene group. In the foregoing groups at least one hydrogen atom of these groups can be substituted with a group having an N, S, O, or F atom, or an amino group. For example, each $R^w$ can be a substituted or unsubstituted phenoxy, an amino, or a polyoxyalkylene group. In some aspects, each $R^w$ is independently a $C_{1-12}$ alkyl, $C_{2-12}$ alkenyl, $C_{1-12}$ alkoxy, $C_{6-12}$ aryl, $C_{6-12}$ aryloxy, or a polyoxy($C_{1-6}$alkylene) group. Any given $R^w$ can further be a crosslink to another phosphazene group. Exemplary crosslinks include bisphenol groups, for example bisphenol A groups. The flame retardant can include phenoxy cyclotriphosphazene, octaphenoxy cyclotetraphosphazene decaphenoxy cyclopentaphosphazene, and the like. A combination of different phosphazenes can be used. A number of phosphazenes and their synthesis are described in H. R. Allcook, "Phosphorous-Nitrogen Compounds" Academic Press (1972), and J. E. Mark et al., "Inorganic Polymers" Prentice-Hall International, Inc. (1992).

The flame retardant is present in an amount effective to provide from 0.1-1.5 wt %, or 0.5-1.0 wt %, or 0.1-0.5 wt % of phosphorous, each based on the total weight of the reinforced polycarbonate compositions. Accordingly, depending on the particular flame retardant used, the reinforced polycarbonate compositions can be from 1-10 wt %, or from greater than 3.25-8 wt %, or from 4-8 wt %, or from 3.25-6.5 wt % of the flame retardant, each based on total weight of the reinforced polycarbonate composition, which sums to 100 wt %.

An anti-drip agent is present in the reinforced polycarbonate composition, for example a fibril forming or non-fibril forming fluoropolymer such as polytetrafluoroethylene (PTFE). The anti-drip agent can be encapsulated by a rigid copolymer as described above, for example styrene-acrylonitrile copolymer (SAN). PTFE encapsulated in SAN is known as TSAN. Encapsulated fluoropolymers can be made by polymerizing the encapsulating polymer in the presence of the fluoropolymer, for example an aqueous dispersion. TSAN can provide significant advantages over PTFE, in that TSAN can be more readily dispersed in the composition. TSAN can comprise 50 wt % PTFE and 50 wt % SAN, based on the total weight of the encapsulated fluoropolymer. The SAN can comprise, for example, 75 wt % styrene and 25 wt % acrylonitrile based on the total weight of the copolymer. Alternatively, the fluoropolymer can be pre-blended in some manner with a second polymer, such as for, example, an aromatic polycarbonate or SAN to form an agglomerated material for use as an anti-drip agent. Either method can be used to produce an encapsulated fluoropolymer. Anti-drip agents care generally used in amounts of 0.01-0.5 wt %, or 0.01-0.3 wt %, or 0.01-0.2 wt %, each based on the total weight of the reinforced polycarbonate composition, which sums to 100 wt %.

The reinforced polycarbonate composition includes a reinforcing fiber (including continuous and chopped fibers) such as asbestos, carbon fibers, glass fibers, such as E, A, C, ECR, R, S, D, or NE glasses, or the like. In addition, the reinforcing fibers can be provided in the form of monofilament or multifilament fibers and can be used individually or in combination with other types of fiber, through, for example, co-weaving or core/sheath, side-by-side, orange-type or matrix and fibril constructions, or by other methods known to one skilled in the art of fiber manufacture. Co-woven structures include glass fiber-carbon fiber, carbon fiber-aromatic polyimide (aramid) fiber, and aromatic polyimide fiberglass fiber or the like. Preferably the reinforcing fiber is a glass fiber.

The reinforcing fibers can be of any cross-sectional shape, for example round, square, ovoid, or irregular. The reinforcing fibers can have an average largest diameter from 1 micrometer to 1 millimeter, or from 1-500 micrometers. The reinforcing fibers can be supplied in the form of, for example, individual fibers, rovings, woven fibrous reinforcements, such as 0-90 degree fabrics or the like; non-woven fibrous reinforcements such as continuous strand mat, chopped strand mat, tissues, papers, felts, or the like; or three-dimensional reinforcements such as braids. The reinforcing fiber can be present from 5-30 wt %, or from 5-20 wt %, or from 5-15 wt %, or from 5-10 wt % based on the total weight of the reinforced polycarbonate composition, which sums to 100 wt %.

The reinforced polycarbonate composition can further comprise an additive composition that can include various additives ordinarily incorporated into polymer compositions of this type, with the proviso that the additive(s) are selected so as to not significantly adversely affect the desired properties of the thermoplastic composition, in particular heat resistance, impact, and flame retardance. Combinations of additives can be used. The additive composition can include an impact modifier, flow modifier, particulate filler (e.g., a particulate polytetrafluoroethylene (PTFE), glass, carbon, mineral, or metal), antioxidant, heat stabilizer, light stabilizer, ultraviolet (UV) light stabilizer, UV absorbing additive, plasticizer, lubricant, release agent (such as a mold release agent), antistatic agent, anti-fog agent, antimicrobial agent, colorant (e.g., a dye or pigment), surface effect additive, radiation stabilizer, flame retardant, anti-drip agent (e.g., a PTFE-encapsulated styrene-acrylonitrile copolymer (TSAN)), or a combination thereof.

There is considerable overlap among plasticizers, lubricants, and mold release agents, which include, for example, phthalic acid esters (e.g., octyl-4,5-epoxy-hexahydrophthalate), tris-(octoxycarbonylethyl)isocyanurate, di- or polyfunctional aromatic phosphates (e.g., resorcinol tetraphenyl diphosphate (RDP), the bis(diphenyl) phosphate of hydroquinone and the bis(diphenyl) phosphate of bisphenol A); poly-alpha-olefins; epoxidized soybean oil; silicones, including silicone oils (e.g., poly(dimethyl diphenyl siloxanes); fatty acid esters (e.g., $C_{1-32}$ alkyl stearyl esters, such as methyl stearate and stearyl stearate and esters of stearic acid such as pentaerythritol tetrastearate, glycerol tristearate (GTS), and the like), waxes (e.g., beeswax, montan wax, paraffin wax, or the like), or combinations comprising at least one of the foregoing plasticizers, lubricants, and mold release agents. These are generally used in amounts of 0.01-5 wt %, based on the total weight of total weight of the reinforced polycarbonate composition, which sums to 100 wt %.

Antioxidant additives include organophosphites such as tris(nonyl phenyl)phosphite, tris(2,4-di-t-butylphenyl)phosphite, bis(2,4-di-t-butylphenyl)pentaerythritol diphosphite, distearyl pentaerythritol diphosphite; alkylated monophenols or polyphenols; alkylated reaction products of polyphenols with dienes, such as tetrakis[methylene(3,5-di-tert-butyl-4-hydroxyhydrocinnamate)]methane; butylated reaction products of para-cresol or dicyclopentadiene; alkylated hydroquinones; hydroxylated thiodiphenyl ethers; alkylidene-bisphenols; benzyl compounds; esters of beta-(3,5-di-tert-butyl-4-hydroxyphenyl)-propionic acid with monohydric or polyhydric alcohols; esters of beta-(5-tert-butyl-4-hydroxy-3-methylphenyl)-propionic acid with monohydric or polyhydric alcohols; esters of thioalkyl or thioaryl compounds such as distearylthiopropionate, dilaurylthiopropionate, ditridecylthiodipropionate, octadecyl-3-(3,5-di-tert-butyl-4-hydroxyphenyl)propionate, pentaerythrityl-tetrakis[3-(3,5-di-tert-butyl-4-hydroxyphenyl) propionate; amides of beta-(3,5-di-tert-butyl-4-hydroxyphenyl)-propionic acid, or combinations comprising at least one of the foregoing antioxidants. Antioxidants are used in amounts of 0.01-0.2, or 0.01-0.1 parts by weight, based on the total weight of the reinforced polycarbonate composition, which sums to 100 wt %.

The reinforced polycarbonate composition can be essentially free of chlorine and bromine. "Essentially free of chlorine and bromine" refers to materials produced without the intentional addition of chlorine or bromine or chlorine or bromine containing materials. It is understood however that in facilities that process multiple products a certain amount of cross contamination can occur resulting in bromine or chlorine levels typically on the parts per million by weight scale. With this understanding it can be readily appreciated that "essentially free of bromine and chlorine" can be defined as having a bromine or chlorine content of less than or equal to 100 parts per million by weight (ppm), less than or equal to 75 ppm, or less than or equal to 50 ppm. In some aspects, "essentially free of bromine and chlorine" means a total bromine and chlorine content of less than or equal to 100 parts per million by weight, or less than or equal to 75 ppm, or less than or equal to 50 ppm. When this definition is applied to the flame retardant it is based on the total weight of the flame retardant. When this definition is applied to the reinforced polycarbonate composition it is based on the total parts by weight of the reinforced polycarbonate composition.

In another aspect, the flame retardant composition can be essentially free of chlorine, bromine, and fluorine. "Essentially free of chlorine, bromine, and fluorine" is defined as having a bromine, chlorine, or fluorine content of less than or equal to 100 ppm, less than or equal to 75 ppm, or less than or equal to 50 ppm, based on the total parts by weight of the composition. Preferably, the flame retardant composition has a combined bromine, chlorine, and fluorine content of less than or equal to 100 ppm, less than or equal to 75 ppm, or less than or equal to 50 ppm, based on the total parts by weight of the composition.

The reinforced polycarbonate compositions can be manufactured by various methods. For example, powdered polycarbonates, flame retardant, or other optional components are first blended, optionally with fillers in a HENSCHEL-Mixer high speed mixer. Other low shear processes, including but not limited to hand mixing, can also accomplish this blending. The blend is then fed into the throat of a twin-screw extruder via a hopper. Alternatively, at least one of the components, for example the reinforcing filler, can be incorporated into the composition by feeding directly into the extruder at the throat or downstream through a sidestuffer. Additives can also be compounded into a masterbatch with a desired polymeric polymer and fed into the extruder. The extruder is generally operated at a temperature higher than that necessary to cause the composition to flow. The extrudate is immediately quenched in a water bath and pelletized. The pellets so prepared can be one-fourth inch long or less as desired. Such pellets can be used for subsequent molding, shaping, or forming.

A molded sample of the reinforced polycarbonate composition can have a Vicat B120 softening temperature of at least 130° C. as measured according to ISO 306.

A molded sample of the reinforced polycarbonate composition can have a notched Izod impact strength of greater than or equal to 8 kiloJoule per square meter as measured at 23° C. according to ISO 180/1 A, or a combination thereof.

A molded sample of the reinforced polycarbonate composition can have an HOT of a heat deflection temperature of greater than 115° C., preferably greater than 125° C., more preferably greater than 130° C., each as measured according to ISO 75 at 0.45 megapascal as measured according to ISO 75.

A molded sample of the reinforced polycarbonate composition can have a flame test rating of V1, preferably V0, as measured according to UL-94 at a thickness of 0.8 millimeter, or at a thickness of 0.6 mm, or at a thickness of 0.4 mm.

Shaped, formed, or molded articles comprising the polycarbonate compositions are also provided. The polycarbonate compositions can be molded into useful shaped articles by a variety of methods, such as injection molding, extrusion, rotational molding, blow molding and thermoforming. Some examples of articles include computer and business machine housings such as housings for monitors, handheld electronic device housings such as housings for cell phones, electrical connectors, and components of lighting fixtures, ornaments, home appliances, roofs, greenhouses, sun rooms, swimming pool enclosures, and the like. In an aspect, the article is an extruded article, a molded article, pultruded article, a thermoformed article, a foamed article, a layer of a multi-layer article, a substrate for a coated article, or a substrate for a metallized article. In addition, the polycarbonate compositions can be used for such applications as a molded housing and other devices such as electrical circuit housing.

This disclosure is further illustrated by the following examples, which are non-limiting.

EXAMPLES

The following components are used in the examples. Unless specifically indicated otherwise, the amount of each component is in wt %, based on the total weight of the polycarbonate composition.

The materials shown in Table 1 were used.

TABLE 1

| Component | Description (Trade name) | Source |
|---|---|---|
| PC-1 | Bisphenol A homopolycarbonate, Mw = 20,000-22,000 g/mol | SABIC |
| HH-PC | PPPBP (N-Phenylphenolphthaleinylbisphenol, 2,2-bis(4-hydro)—bisphenol A polycarbonate, 32 mol % PPPBP, Mw 23,000 g/mol interfacial polymerization, PCP end-capped, PDI = 2-3 | SABIC |
| PC-Si | Poly(bisphenol A carbonate-dimethylsiloxane) copolymer produced via interfacial polymerization, 20 wt % siloxane, average siloxane block length = 45 units (D45), Mw = 29,000-31,000 g/mol, as determined by GPC using bisphenol A homopolycarbonate standards, para-cumylphenol (PCP) end-capped, PDI = 2-3 | SABIC |
| FR-1 (PCP) | Phenoxycyclophosphazene (FP-110T) | Fushimi |
| FR-2 (ABP) | Aryl bisphosphate (FYROFLEX Sol DP) | ICL-IP |
| AO | Hindered phenolic antioxidant (IRGANOX 1076) | Ciba |
| PETS | Pentaerythritol tetrastearate | Faci |
| Anti-drip | Styrene-acrylonitrile (SAN)-encapsulated PTFE | SABIC |
| Stab | Tris(2,4-di-tert-butylphenyl) phosphite (IRGAFOS 168) | Ciba-Geigy |
| GF-1 | Flat glass fiberglass (CSG 3PA-830) | Nittobo |
| GF-2 | Chopped glass (aluminum-borosilicate) fiber, bonding (with sizing) for PC, fiber length 2-5 mm, diameter 12-15.5 μm | Nippon Electric Glass |

The samples were prepared as described below and the following test methods were used.

All powder additives were combined together with the polycarbonate powder(s), using a paint shaker, and fed through one feeder to an extruder. Extrusion for all combinations was performed on a 25 mm twin screw extruder, using a melt temperature of 260-315° C. and 300 revolutions per minute (rpm), then pelleted. The glass fibers were fed separately through the hopper on a downstream side-feeder. The pellets were dried for 3-5 hours at 90-100° C. Dried pellets were injection molded at temperatures of 260-315° C. to form specimens for most of the tests below.

Molding of test specimen for testing was done on an Engel 45 Ton injection molding machine equipped with insert molds from AXXICON.

Tensile properties (tensile stress at break, tensile strain at break, and tensile modulus at break) were determined in accordance with ISO-527 at 23° C.

Heat distortion temperature (HDT) was determined in accordance with the ISO-75 standard with a 5.5 Joule hammer, using the flat side of 4 mm thick ISO bars and a load of 1.8 MPa (A/f) and 0.45 MPa (A/f).

Unnotched Izod impact resistance (UIR) and notched Izod impact resistance (NIR) were determined on 3.2 mm thick bars by ISO-180 with a 5.5 J hammer at 23° C.

ISO notched Izod impact measurements (Notched Izod ISO) were performed on notched 4 mm-thick ISO bars at 23° C., in accordance with the ISO-180:2000 standard with a 5.5 J hammer.

Vicat softening temperature (Vicat) was measured on 4 mm thick ISO bars in accordance with the ISO-306 standard at a load of 10 N and a heating rate of 50° C./h (B50) or a load of 50 N and a speed of 120° C./h (B120).

Flammability was determined by using the UL-94 standard. Vx vertical flammability tests were performed at 0.8 mm.

Examples 1-11

The formulations and properties of Comparative Examples 1 (CE1) and Examples 2-11 (E2-E11) are shown in Table 2.

TABLE 2

| | Unit | CE1 | E2 | E3 | E4 | E5 | E6 | Ex7 | Ex8 | Ex9 | E10 | E11 |
|---|---|---|---|---|---|---|---|---|---|---|---|---|
| Component | | | | | | | | | | | | |
| PC | Wt % | 74.6 | 54.6 | 54.6 | 57.9 | 44.6 | 47.9 | 45.1 | 35.1 | 39.1 | 36.6 | 36.6 |
| PC-Si | Wt % | 8 | 8 | 8 | 8 | 8 | 8 | 16 | 16 | 16 | 16 | 16 |
| HH-PC | Wt % | | 20 | 20 | 20 | 30 | 30 | 20 | 30 | 30 | 30 | 30 |
| PETS | Wt % | 0.5 | 0.5 | 0.5 | 0.5 | 0.5 | 0.5 | 0.5 | 0.5 | 0.5 | 0.5 | 0.5 |
| AO | Wt % | 0.1 | 0.1 | 0.1 | 0.1 | 0.1 | 0.1 | 0.1 | 0.1 | 0.1 | 0.1 | 0.1 |
| Stab | Wt % | 0.1 | 0.1 | 0.1 | 0.1 | 0.1 | 0.1 | 0.1 | 0.1 | 0.1 | 0.1 | 0.1 |
| Anti-drip | Wt % | 0.2 | 0.2 | 0.2 | 0.2 | 0.2 | 0.2 | 0.2 | 0.2 | 0.2 | 0.2 | 0.2 |
| FR-1 (PCP) | Wt % | 6.5 | 6.5 | 6.5 | 3.25 | 6.5 | 3.25 | | | | 6.5 | 6.5 |
| FR-2 (ABP) | Wt % | | | | | | | 8 | 8 | 4 | | |
| Phosphorous* | Wt % | 0.87 | 0.87 | 0.87 | 0.44 | 0.87 | 0.44 | 0.86 | 0.86 | 0.43 | 0.87 | 0.87 |
| GF 1 | Wt % | 10 | 10 | 10 | 10 | 10 | 10 | 10 | 10 | 10 | | |
| GF-2 | Wt % | | | | | | | | | | | 10 |
| Property | | | | | | | | | | | | |
| Tensile Stress, break | MPa | 89 | 92 | 93 | 90 | 93 | 91 | 99 | 99 | 95 | 86 | 91 |
| Tensile Strain, break | % | 3.5 | 3.6 | 3.7 | 3.9 | 3.7 | 4.0 | 3.2 | 3.2 | 3.4 | 3.1 | 3.6 |
| Tensile modulus | MPa | 4400 | 4500 | 4500 | 4400 | 4500 | 4400 | 4800 | 4900 | 4700 | 4400 | 4400 |
| NII, 23° C. | kJ/m$^2$ | 9 | 8 | 9 | 11 | 9 | 10 | 12 | 11 | 14 | 11 | 13 |
| UNI, 23° C. | kJ/m$^2$ | 61 | 56 | 46 | 51 | 46 | 54 | 42 | 41 | 42 | 39 | 42 |
| HDT, 0.45 MPa | ° C. | 122 | 132 | 136 | 140 | 136 | 145 | 117 | 122 | 137 | 137 | 137 |
| HDT, 1.82 MPa | ° C. | 117 | 126 | 130 | 134 | 129 | 139 | 111 | 115 | 129 | 130 | 131 |
| Vicat B50 | ° C. | 125 | 134 | 139 | 143 | 139 | 147 | 119 | 124 | 139 | 139 | 140 |
| Vicat B120 | ° C. | 126 | 135 | 140 | 145 | 140 | 148 | 121 | 126 | 141 | 141 | 141 |
| UL94 at 0.8 mm | | V0 | V0 | V0 | V1 | V0 | V1 | V0 | V0 | V0 | V0 | V0 |

*Weight percent of phosphorous provided by the flame retardant

As shown in Table 2, CE1, a composition including a bisphenol A homopolycarbonate and a poly(carbonate-siloxane) but no high heat polycarbonate has lower heat resistance (as indicated by HDT and Vicat softening temperature) than compositions including the same homopolycarbonate, poly(carbonate-siloxane), and a high-heat polycarbonate (E2-E6 and E9-E11).

The identity of flame retardant present in the composition affects the heat resistance of the composition. For example, when the flame retardant is an aryl bisphosphate such as FR-2 as in E7-E8, the heat resistance of the composition decreases relative to compositions containing FR-1, and instead is closer to the heat resistance of CE1 (HDT, 0.45 MPa) or decreased (HDT, 1.82 MPa).

Decreasing the amount of FR-1 (phosphazene) by half resulted in reduced flame retardance (UL-94 rating of V1 at 0.8 mm) (compare E4 and E6 with E2-3, E5, and E10-E11). The amount of phosphazene was therefore maintained at a level of 6.5 wt % while the amount of high-heat polycarbonate was increased from 20 wt % (E2-E4) to 30 wt % (E10-E11). The resulting compositions showed an improvement in impact and heat resistance, and desirably, a UL-94 rating at 0.8 mm of V0. Furthermore, E10 and E11 show that different types of glass (e.g., standard e-glass, flat glass fiber) provide compositions with similar mechanical, impact, and flammability properties.

This disclosure further encompasses the following aspects.

Aspect 1. A reinforced polycarbonate composition, comprising 30-60 wt % of a homopolycarbonate; 5-30 wt % of a poly(carbonate-siloxane), preferably present in an amount effective to provide 2-6 wt % of siloxane; 10-40 wt % of a high heat polycarbonate having a glass transition temperature of 170° C. or higher determined per ASTM D3418 with a 20° C./min heating rate; 1-10 wt % of a phosphorous-containing flame retardant present in amount effective to provide 0.1-1.5 wt % phosphorous; 0.01-0.5 weight percent of an anti-drip agent; 5-30 wt % of a reinforcing fiber; and optionally, up to 10 wt % of an additive composition, wherein each amount is based on the total weight of the reinforced polycarbonate composition, which sums to 100 wt %; and wherein a molded sample of the polycarbonate composition has a heat deflection temperature of 115° C., preferably greater than 125° C., more preferably greater than 130° C., each as measured according to ISO 75 at 0.45 megapascal, or a flame test rating of V1, preferably V0 as measured according to UL-94 at a thickness of 0.8 millimeter, or at a thickness of 0.6 mm, or at a thickness of 0.4 mm, or a combination thereof.

Aspect 2. The reinforced polycarbonate composition of aspect 1 wherein the reinforced polycarbonate composition comprises 30-60 wt % of the homopolycarbonate; 5-20 wt % of the poly(carbonate-siloxane), present in an amount effective to provide 2-4 wt % of dimethyl siloxane; 15-35 wt % of the high heat polycarbonate; 2-8 wt % of the flame retardant, wherein the flame retardant is preferably an oligomeric phosphate, a phosphazene, or a combination thereof, present in amount effective to provide 0.4-1.0 wt % phosphorous; 0.01-0.5 weight percent of polytetrafluoroethylene or an encapsulated polytetrafluoroethylene as an anti-drip agent; and 5-30 wt % of the reinforcing fiber, preferably glass fibers; wherein each amount is based on the total weight of the reinforced polycarbonate composition, which sums to 100 wt %.

Aspect 3. The reinforced polycarbonate composition of aspect 1, wherein the homopolycarbonate comprises a bisphenol A homopolycarbonate having a weight average molecular weight from 18,000-35,000 grams/mole, preferably 20,000-25,000 grams/mole; or a bisphenol A homopolycarbonate having a weight average molecular weight from 25,000-35,000 grams/mole, preferably 27,000-32,000 grams/mole; or a combination thereof, each as measured via gel permeation chromatography using bisphenol A homopolycarbonate standards.

Aspect 4. The reinforced polycarbonate composition of aspect 1, wherein the poly(carbonate-siloxane) comprises 50-99 wt % of bisphenol A carbonate units and 1-50 wt % of dimethylsiloxane units, each based on the weight of the poly(carbonate-siloxane) preferably wherein the poly(carbonate-siloxane) comprises siloxane units of the formula

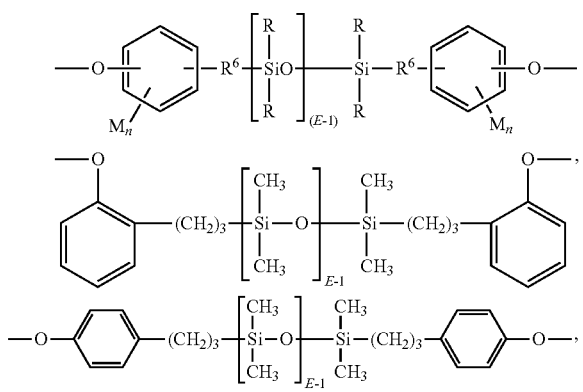

or a combination thereof, wherein E has an average value of 2-200, 2-125, 5-125, 5-100, 5-50, 20-80, or 5-20. 5.

Aspect 5. The reinforced polycarbonate composition of aspect 1, wherein the high heat polycarbonate comprises a poly(ester-carbonate) comprising aromatic carbonate units, preferably bisphenol A carbonate units, and aromatic ester unit derived from terephthalic acid, isophthalic acid, and bisphenol A.

Aspect 6. The reinforced polycarbonate composition of aspect 1, wherein the high heat polycarbonate comprises high heat aromatic carbonate units derived from 1,1-bis(4-hydroxyphenyl)-3,3,5-trimethyl-cyclohexane, N-phenyl phenolphthalein bisphenol, 4,4'-(1-phenylethylidene)bisphenol, 4,4'-(3,3-dimethyl-2,2-dihydro-1H-indene-1,1-diyl)_diphenol, 1,1-bis(4-hydroxyphenyl)cyclododecane, 3,8-dihydroxy-5a,10b-diphenyl-coumarano-2',3',2,3-coumarane, or a combination thereof, preferably 1,1-bis(4-hydroxyphenyl)-3,3,5-trimethyl-cyclohexane, N-phenyl phenolphthalein bisphenol, or a combination thereof; and optionally, low heat aromatic carbonate units, preferably bisphenol A carbonate units.

Aspect 7. The reinforced polycarbonate composition of aspect 1, wherein the flame retardant is of the formula

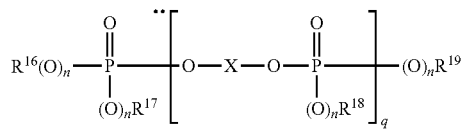

wherein $R^{16}$, $R^{17}$, $R^{18}$ and $R^{19}$ are each independently $C_{1-8}$ alkyl, $C_{5-6}$ cycloalkyl, $C_{6-20}$ aryl, or $C_{7-12}$ arylalkylene, each optionally substituted by $C_{1-12}$ alkyl, and X is a mono- or poly-nuclear aromatic $C_{6-30}$ moiety or a linear or branched $C_2$-30 aliphatic radical, which can be OH-substituted and can contain up to 8 ether bonds, provided that at least one of $R^{16}$, $R^{17}$, $R^{18}$, $R^{19}$, and X is aromatic, n is each independently 0 or 1, and q is from 0.5-30, and preferably wherein each of $R^{16}$, $R^{17}$, $R^{18}$, and $R^{19}$ is phenyl, X is of formulas

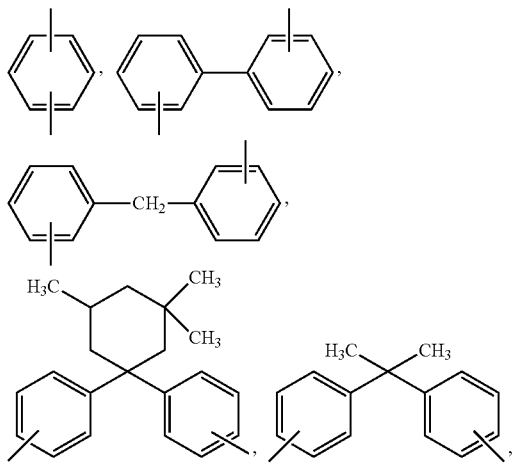

or a combination thereof, each n is 1, and q is 1-5.

Aspect 8. The reinforced polycarbonate composition of aspect 1, wherein the flame retardant is of the formula

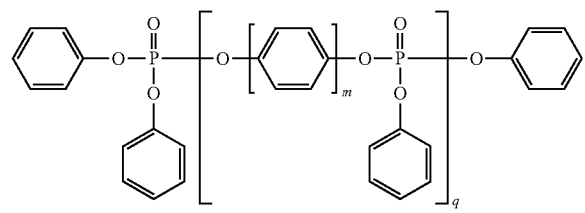

wherein m is 1 or 2, and q is 1-5, the flame retardant is present in an amount effective to provide 0.1-0.5 weight percent of phosphorous; and a molded sample of the composition has a heat deflection temperature of greater than 130° C. as measured according to ISO 75 at 0.45 megapascal; and a flame test rating of V0 as measured according to UL-94 at a thickness of 0.8 millimeter, or at a thickness of 0.6 mm, or at a thickness of 0.4 mm.

Aspect 9. The reinforced polycarbonate composition of aspect 1, wherein the flame retardant is a phosphazene is of formulas

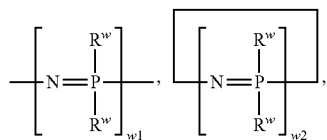

or a combination thereof, wherein w1 is 3-10,000, w2 is 3-25, preferably 3-7, and each $R^w$ is independently a $C_{1-12}$ alkyl, $C_{2-12}$ alkenyl, $C_{1-12}$ alkoxy, $C_{6-12}$ aryl, $C_{6-12}$ aryloxy, or polyoxy($C_{1-6}$ alkylene) group.

Aspect 10. The reinforced polycarbonate composition of aspect 9, wherein the flame retardant is a phenoxy cyclotriphosphazene, octaphenoxy cyclotetraphosphazene, decaphenoxy cyclopentaphosphazene, or a combination thereof; and the flame retardant is present in an amount effective to provide 0.5 to 1.0 weight percent of phosphorous; and a molded sample of the composition has a heat deflection temperature of greater than 130° C. as measured according to ISO 75 at 0.45 megapascal; and a flame test rating of V0 as measured according to UL-94 at a thickness of 0.8 millimeter, or at a thickness of 0.6 mm, or at a thickness of 0.4 mm.

Aspect 11. The composition of aspect 1, wherein a molded sample of the polycarbonate composition has a Vicat B120 softening temperature of at least 130° C. as measured according to ISO 306, or a notched Izod impact strength of greater than or equal to 8 kiloJoule per square meter as measured at 23° C. according to ISO 180/1 A, or a bromine or chlorine content of less than or equal to 100 parts per million by weight, or a total bromine and chlorine content of less than or equal to 100 parts per million by weight, or a combination thereof.

Aspect 12. An article of aspect 1, wherein the article is an extruded article, a molded article, pultruded article, a thermoformed article, a foamed article, a layer of a multi-layer article, a substrate for a coated article, or a substrate for a metallized article, preferably wherein the article is a molded article.

Aspect 13. The article of aspect 12, wherein the article is a molded housing for electrical components.

Aspect 14. The article of aspect 12, wherein the article is an electrical circuit housing.

Aspect 15. A method for forming the article of aspect 12, comprising molding, casting, or extruding the article.

The compositions, methods, and articles can alternatively comprise, consist of, or consist essentially of, any appropriate materials, steps, or components herein disclosed. The compositions, methods, and articles can additionally, or alternatively, be formulated so as to be devoid, or substantially free, of any materials (or species), steps, or components, that are otherwise not necessary to the achievement of the function or objectives of the compositions, methods, and articles.

All ranges disclosed herein are inclusive of the endpoints, and the endpoints are independently combinable with each other (e.g., ranges of "up to 25 wt %, or, more specifically, 5 wt % to 20 wt %", is inclusive of the endpoints and all intermediate values of the ranges of "5 wt % to 25 wt %," etc.). "Combinations" is inclusive of blends, mixtures, alloys, reaction products, and the like. The terms "first," "second," and the like, do not denote any order, quantity, or importance, but rather are used to distinguish one element from another. The terms "a" and "an" and "the" do not denote a limitation of quantity and are to be construed to cover both the singular and the plural, unless otherwise indicated herein or clearly contradicted by context. "Or" means "and/or" unless clearly stated otherwise. Reference throughout the specification to "some aspects," "an aspect," and so forth, means that a particular element described in connection with the aspect is included in at least one aspect described herein, and may or may not be present in other aspects. In addition, it is to be understood that the described elements may be combined in any suitable manner in the various aspects. A "combination thereof" is open and includes any combination comprising at least one of the listed components or properties optionally together with a like or equivalent component or property not listed.

Unless specified to the contrary herein, all test standards are the most recent standard in effect as of the filing date of this application, or, if priority is claimed, the filing date of the earliest priority application in which the test standard appears.

Unless defined otherwise, technical and scientific terms used herein have the same meaning as is commonly understood by one of skill in the art to which this application belongs. All cited patents, patent applications, and other references are incorporated herein by reference in their entirety. However, if a term in the present application contradicts or conflicts with a term in the incorporated reference, the term from the present application takes precedence over the conflicting term from the incorporated reference.

Compounds are described using standard nomenclature. For example, any position not substituted by any indicated group is understood to have its valency filled by a bond as indicated, or a hydrogen atom. A dash ("-") that is not between two letters or symbols is used to indicate a point of attachment for a substituent. For example, —CHO is attached through carbon of the carbonyl group.

The term "alkyl" means a branched or straight chain, unsaturated aliphatic hydrocarbon group, e.g., methyl, ethyl, n-propyl, i-propyl, n-butyl, s-butyl, t-butyl, n-pentyl, s-pentyl, and n- and s-hexyl. "Alkenyl" means a straight or branched chain, monovalent hydrocarbon group having at least one carbon-carbon double bond (e.g., ethenyl (—HC=CH$_2$)). "Alkoxy" means an alkyl group that is linked via an oxygen (i.e., alkyl-O—), for example methoxy, ethoxy, and sec-butyloxy groups. "Alkylene" means a straight or branched chain, saturated, divalent aliphatic hydrocarbon group (e.g., methylene (—CH$_2$—) or, propylene (—(CH$_2$)$_3$—)). "Cycloalkylene" means a divalent cyclic alkylene group, —C$_n$H$_{2n-x}$, wherein x is the number of hydrogens replaced by cyclization(s). "Cycloalkenyl" means a monovalent group having one or more rings and one or more carbon-carbon double bonds in the ring, wherein all ring members are carbon (e.g., cyclopentyl and cyclohexyl). "Aryl" means an aromatic hydrocarbon group containing the specified number of carbon atoms, such as phenyl, tropone, indanyl, or naphthyl. "Arylene" means a divalent aryl group. "Alkylarylene" means an arylene group substituted with an alkyl group. "Arylalkylene" means an alkylene group substituted with an aryl group (e.g., benzyl). The prefix "halo" means a group or compound including one more of a fluoro, chloro, bromo, or iodo substituent. A combination of different halo groups (e.g., bromo and fluoro), or only chloro groups can be present. The prefix "hetero" means that the compound or group includes at least one ring member that is a heteroatom (e.g., 1, 2, or 3 heteroatom(s)), wherein the heteroatom(s) is each independently N, O, S, Si, or P. "Substituted" means that the compound or group is substituted with at least one (e.g., 1, 2, 3, or 4) substituents that can each independently be a C$_{1-9}$ alkoxy, a C$_{1-9}$ haloalkoxy, a nitro (—NO$_2$), a cyano (—CN), a C$_{1-6}$ alkyl sulfonyl (—S(=O)$_2$-alkyl), a C$_{6-12}$ aryl sulfonyl (—S(=O)$_2$-aryl) a thiol (—SH), a thiocyano (—SCN), a tosyl (CH$_3$C$_6$H$_4$SO$_2$—), a C$_{3-12}$ cycloalkyl, a C$_{2-2}$ alkenyl, a C$_{5-12}$ cycloalkenyl, a C$_{6-12}$ aryl, a C$_{7-13}$ arylalkylene, a C$_4$-12 heterocycloalkyl, and a C$_{3-12}$ heteroaryl instead of hydrogen, provided that the substituted atom's normal valence is not exceeded. The number of carbon atoms indicated in a group is exclusive of any substituents. For example —CH$_2$CH$_2$CN is a C$_2$ alkyl group substituted with a nitrile.

While particular aspects have been described, alternatives, modifications, variations, improvements, and substantial equivalents that are or may be presently unforeseen may arise to applicants or others skilled in the art. Accordingly, the appended claims as filed and as they may be amended are intended to embrace all such alternatives, modifications variations, improvements, and substantial equivalents.

What is claimed is:

1. A reinforced polycarbonate composition comprising
   30-60 weight percent of a bisphenol A homopolycarbonate; and
   10-40 weight percent of a high heat polycarbonate having a glass transition temperature of 170° C. or higher determined per ASTM D3418 with a 20° C./min heating rate; and
   8-16 weight percent of a poly(carbonate-siloxane) and
   1-10 weight percent of a phosphorous-containing flame retardant comprising a phosphazene present in amount effective to provide 0.5 to 1.5 weight percent phosphorous,
   wherein the phosphazene is a phenoxy cyclotriphosphazene, octaphenoxy cyclotetraphosphazene, decaphenoxy cyclopentaphosphazene, or a combination thereof, or the phosphazene is of formulas

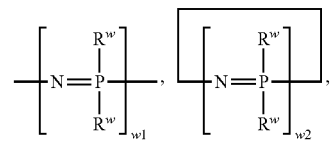

or a combination thereof, wherein
   w1 is 3-10,000,
   w2 is 3-25, and
   each R$^w$ is independently a C$_{1-12}$ alkyl, C$_{2-12}$ alkenyl, C$_{1-12}$ alkoxy, C$_{6-12}$ aryl, C$_{6-12}$ aryloxy, or polyoxy(C$_{1-6}$ alkylene) group; and
   0.01-0.5 weight percent of an anti-drip agent; and
   5-30 weight percent of glass fibers; and
   optionally, up to 5 weight percent of an additive composition,
   wherein each amount is based on the total weight of the reinforced polycarbonate composition, which sums to 100 weight percent; and
   wherein a molded sample of the polycarbonate composition has
      a heat deflection temperature of greater than 115° C., as measured according to ISO 75 at 0.45 megapascal,
      a Vicat B120 softening temperature of at least 130° C. as measured according to ISO 306, and
      a flame test rating of V0 as measured according to UL-94 at a thickness of 0.8 millimeter.

2. The reinforced polycarbonate composition of claim 1, wherein the homopolycarbonate comprises
   a bisphenol A homopolycarbonate having a weight average molecular weight from 18,000-35,000 grams/mole; or
   a bisphenol A homopolycarbonate having a weight average molecular weight from 25,000-35,000 grams/mole; or a combination thereof,
each as measured via gel permeation chromatography using bisphenol A homopolycarbonate standards.

3. The reinforced polycarbonate composition of claim 1, wherein the poly(carbonate-siloxane) comprises 50-99 weight percent of bisphenol A carbonate units and 1-50 weight percent of dimethylsiloxane units, each based on the weight of the poly(carbonate-siloxane).

4. The reinforced polycarbonate composition of claim 1, wherein the high heat polycarbonate comprises high heat aromatic carbonate units derived from 1,1-bis(4-hydroxyphenyl)-3,3,5-trimethyl-cyclohexane, N-phenyl phenolphthalein bisphenol, 4,4'-(1-phenylethylidene) bisphenol, 4,4'-(3,3-dimethyl-2,2-dihydro-1H-indene-1,1-diyl)diphenol, 1,1-bis(4-hydroxyphenyl)cyclododecane, 3,8-dihydroxy-5a,10b-diphenyl-coumarano-2',3',2,3-coumarane, or a combination thereof; and optionally, low heat aromatic carbonate units.

5. The composition of claim 1, wherein a molded sample of the polycarbonate composition has
  a notched Izod impact strength of greater than or equal to 8 kilojoule per square meter as measured at 23° C. according to ISO 180/1 A, or
  a bromine or chlorine content of less than or equal to 100 parts per million by weight, or
  a total bromine and chlorine content of less than or equal to 100 parts per million by weight, or
  a combination thereof.

6. An article of claim 1, wherein the article is an extruded article, a molded article, pultruded article, a thermoformed article, a foamed article, a layer of a multi-layer article, a substrate for a coated article, or a substrate for a metallized article.

7. The article of claim 6, wherein the article is a molded housing for electrical components.

8. The article of claim 6, wherein the article is an electrical circuit housing.

9. A method for forming the article of claim 6, comprising molding, casting, or extruding the article.

10. The reinforced polycarbonate composition of claim 1 comprising up to 2 weight percent of the optional additive composition.

11. The reinforced polycarbonate composition of claim 1 comprising up to 1 weight percent of the optional additive composition.

12. The reinforced polycarbonate composition of claim 1 comprising 5-15 weight percent glass fibers.

13. The reinforced polycarbonate composition of claim 1 comprising 20-40 weight percent high heat copolycarbonate.

14. The reinforced polycarbonate composition of claim 13 comprising 20-30 wt % glass fibers.

15. A reinforced polycarbonate composition comprising
  30-60 weight percent of a homopolycarbonate;
  5-30 weight percent of a poly(carbonate-siloxane);
  10-40 weight percent of a high heat polycarbonate having a glass transition temperature of 170° C. or higher determined per ASTM D3418 with a 20° C./min heating rate and comprising a poly(ester-carbonate) comprising bisphenol A carbonate units, and aromatic ester units derived from bisphenol A;
  1-10 weight percent of a phosphorous-containing flame retardant present in amount effective to provide 0.1-1.5 weight percent phosphorous;
  0.01-0.5 weight percent of an anti-drip agent;
  5-30 weight percent of a reinforcing fiber; and
  optionally, up to 10 weight percent of an additive composition,
  wherein each amount is based on the total weight of the reinforced polycarbonate composition, which sums to 100 weight percent; and
  wherein a molded sample of the polycarbonate composition has
  a heat deflection temperature of greater than 115° C., as measured according to ISO 75 at 0.45 megapascal, or
  a flame test rating of V1 as measured according to UL-94 at a thickness of 0.8 millimeter.

16. An article of claim 15, wherein the article is an extruded article, a molded article, pultruded article, a thermoformed article, a foamed article, a layer of a multi-layer article, a substrate for a coated article, or a substrate for a metallized article.

* * * * *